US010539225B2

United States Patent
Nakano et al.

(10) Patent No.: US 10,539,225 B2
(45) Date of Patent: Jan. 21, 2020

(54) POWER SYSTEM

(71) Applicant: HONDA MOTOR CO., LTD., Tokyo (JP)

(72) Inventors: Yoshihiro Nakano, Saitama (JP); Koji Ono, Saitama (JP); Noriyasu Hakuta, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 104 days.

(21) Appl. No.: 15/963,204

(22) Filed: Apr. 26, 2018

(65) Prior Publication Data
US 2018/0328480 A1 Nov. 15, 2018

(30) Foreign Application Priority Data
May 9, 2017 (JP) .................. 2017-093149

(51) Int. Cl.
*F16H 57/04* (2010.01)
*H02K 9/19* (2006.01)
(Continued)

(52) U.S. Cl.
CPC ..... *F16H 57/0476* (2013.01); *F16H 57/0457* (2013.01); *F16H 57/0483* (2013.01);
(Continued)

(58) Field of Classification Search
USPC ........................................................ 475/159
See application file for complete search history.

(56) References Cited

U.S. PATENT DOCUMENTS 3,529,698 A * 9/1970 Nelson .................... B61C 17/08
184/6.12
6,616,432 B2 * 9/2003 Szczepanski .......... F04C 2/082
184/11.1
(Continued)

FOREIGN PATENT DOCUMENTS

CN 106133400 A 11/2016
JP S54-093684 U 7/1979
(Continued)

OTHER PUBLICATIONS

Oct. 2, 2018, Japanese Office Action issued for related JP application No. 2017-093149.
(Continued)

*Primary Examiner* — Dirk Wright
(74) *Attorney, Agent, or Firm* — Paratus Law Group, PLLC

(57) ABSTRACT

A power system includes: a rotating body; a housing accommodating the rotating body; and a storage portion provided at a bottom of the housing. A part of the rotating body is located in the storage portion. The housing includes: a supply target portion; and a direction changing portion. The direction changing portion includes: a collecting portion that is gradually inclined toward a downstream side in a rotation direction of the rotating body so as to be separated from an outer periphery of the rotating body and that receives the liquid medium scattered by the rotating body; and a guiding portion that is provided so as to cross a lower end of the collecting portion and that is gradually inclined downward toward the supply target portion.

8 Claims, 9 Drawing Sheets

(51) Int. Cl.
  *H02K 5/20* (2006.01)
  *H02K 7/116* (2006.01)
  *F16H 37/08* (2006.01)
  *F16H 48/08* (2006.01)
  *F16H 57/037* (2012.01)
  *F16H 57/02* (2012.01)

(52) U.S. Cl.
  CPC ........... *F16H 57/0495* (2013.01); *H02K 5/20* (2013.01); *H02K 7/116* (2013.01); *H02K 9/19* (2013.01); *F16H 37/0813* (2013.01); *F16H 48/08* (2013.01); *F16H 57/037* (2013.01); *F16H 2057/02034* (2013.01)

(56) References Cited

U.S. PATENT DOCUMENTS

| | | | |
|---|---|---|---|
| 8,931,596 B2* | 1/2015 | Shioiri | F16H 57/0423 184/6.12 |
| 9,052,009 B2* | 6/2015 | Barillot | F16H 57/0409 |
| 9,074,678 B1 | 7/2015 | Marsh, Jr. et al. | |
| 9,140,349 B1 | 9/2015 | Marsh et al. | |
| 9,309,959 B2* | 4/2016 | Ishikawa | F16H 57/027 |
| 10,190,673 B2* | 1/2019 | Creech | F16H 57/0435 |
| 10,208,848 B2* | 2/2019 | Hotait | F16H 57/0423 |
| 10,371,248 B2* | 8/2019 | Kawakami | F16H 48/08 |
| 2011/0214947 A1* | 9/2011 | Tuomas | F16H 57/0423 184/6.12 |
| 2017/0130816 A1 | 5/2017 | Koga | |
| 2018/0171838 A1* | 6/2018 | Maruyama | F16N 7/26 |

FOREIGN PATENT DOCUMENTS

| | | |
|---|---|---|
| JP | H06-054958 U | 7/1994 |
| JP | H09-100899 A | 4/1997 |
| JP | 2013-106416 A | 5/2013 |

OTHER PUBLICATIONS

Feb. 5, 2019, Japanese Office Action issued for related JP Application No. 2017-093149.

Dec. 3, 2019, Chinese Office Action issued for related CN Application No. 201810396268.X.

* cited by examiner

POWER SYSTEM

CROSS-REFERENCE TO RELATED APPLICATION (S)

This application claims priority from Japanese Patent Application No. 2017-093149 filed on May 9, 2017, the entire contents of which are incorporated herein by reference.

FIELD

The present invention relates to a power system that is provided in an electric motor vehicle.

BACKGROUND

There is known a power system that includes a rotating body, a housing for accommodating the rotating body, and a storage portion provided at a bottom of the housing to store lubricating oil, and in which a part of the rotating body is located in the storage portion and the lubricating oil stored in the storage portion is scattered with rotation of the rotating body and is supplied to a necessary portion in the housing.

For example, a power system is disclosed in JP-A-2013-106416 that includes a liquid guiding unit for guiding lubricating oil scattered by a rotating body to an electric motor disposed on one side in an axial direction of the rotating body.

However, since the liquid guiding unit disclosed in the JP-A-2013-106416 is inclined above the rotating body and the electric motor to guide the lubricating oil scattered by the rotating body toward the electric motor along the inclination and to drip the lubricating oil from the upper side of the electric motor, an arrangement space for the liquid guiding unit is required above the rotating body and the electric motor, and thus the size of the housing may be increased (particularly, the size in a height direction is increased). It is also conceivable to forcibly supply the lubricating oil to the electric motor, but in this case, an electric oil pump or the like should be additionally provided.

SUMMARY

The invention is to provide a power system capable of supplying appropriately lubricating oil scattered by a rotating body to a supply target portion disposed on one side in an axial direction of the rotating body while preventing a housing from being increased in size.

The invention provides following aspects (1) to (8).

(1) A power system (e.g., a power system 1 in an embodiment) including:
a rotating body (e.g., a second gear 52 in an embodiment);
a housing (e.g., a housing 4 in an embodiment) that accommodates the rotating body; and
a storage portion (e.g., a storage portion 44 in an embodiment) that is provided at a bottom of the housing to store a liquid medium, wherein
a part of the rotating body is located in the storage portion,
the housing comprises:
a supply target portion (e.g., an electric motor 2 in an embodiment) that needs to be lubricated or cooled and that is provided on one side in an axial direction of the rotating body; and
a direction changing portion (e.g., a direction changing portion 7 in an embodiment) that is provided on an inner surface of the housing and that changes a flow direction of the liquid medium scattered by the rotating body toward the supply target portion, and
the direction changing portion includes:
a collecting portion (e.g., a collecting portion 71 in an embodiment) that is gradually inclined toward a downstream side in a rotation direction of the rotating body so as to be separated from an outer periphery of the rotating body and that receives the liquid medium scattered by the rotating body; and
a guiding portion (e.g., a guiding portion 72 in an embodiment) that is provided so as to cross a lower end of the collecting portion and that is gradually inclined downward toward the supply target portion.

(2) The power system according to (1), wherein
the direction changing portion is recessed in the inner surface of the housing.

(3) The power system according to (2), wherein
the direction changing portion is formed integrally with the housing.

(4) The power system according to (2), wherein
the direction changing portion is formed separately from the housing and is fixed to the housing.

(5) The power system according to (4), wherein
a liquid medium passage (e.g., a pipe body 73 in an embodiment) is disposed below the guiding portion to supply the liquid medium to the supply target portion.

(6) The power system according to any one of (1) to (5), wherein
the direction changing portion is provided at a region on the downstream side from an uppermost part of the rotating body in the rotation direction, on the inner surface of the housing.

(7) The power system according to (6), wherein
the power system is a power system for a vehicle, and
the rotation direction is a rotation direction of the rotating body when the vehicle moves forward.

(8) The power system according to any one of (1) to (7), wherein
the power system includes:
an electric motor (e.g., the electric motor 2 in an embodiment) that drives a left wheel and a right wheel of the vehicle;
a transmission (e.g., a transmission 5 in an embodiment) that is disposed on power transmission paths between the electric motor and the left wheel and between the electric motor and the right wheel; and
a differential gear system (e.g., a differential gear system 6 in an embodiment) that distributes output power shifted by the transmission to the left wheel and the right wheel,
the housing accommodates the electric motor, the transmission, and the differential gear system,
the transmission includes:
a first gear (e.g., a first gear 51 in an embodiment) that is mechanically connected to the electric motor;
a second gear (e.g., the second gear 52 in an embodiment) that has a rotation axis in common with the first gear and is mechanically connected to a differential gear casing (e.g., a differential gear casing 61 in an embodiment) of the differential gear system; and
a counter gear (e.g., a counter gear 53 in an embodiment) that meshes with the first gear and the second gear,
the supply target portion is the electric motor, and
the rotating body is the second gear.

According to aspect (1), since the inner surface of the housing is provided with the direction changing portion that changes the flow direction of the liquid medium scattered by the rotating body toward the supply target portion, it is possible to supply appropriately the liquid medium scattered by the rotating body to the supply target portion disposed on one side in the axial direction of the rotating body while preventing the housing from being increased in size, whereby the supply target portion can also be lubricated and/or cooled without an electric oil pump.

In addition, since the direction changing portion includes the collecting portion receiving the liquid medium scattered by the rotating body and the guiding portion provided so as to cross the lower end of the collecting portion and inclined downward toward the supply target portion, it is possible to guide the liquid medium collected by the collecting portion to the supply target portion, using gravity, through the guiding portion.

According to aspect (2), since the direction changing portion is recessed in the inner surface of the housing, it is possible to supply the liquid medium stored in the recessed space to the supply target portion.

According to aspect (3), since the direction changing portion is formed integrally with the housing, the number of parts can be reduced as compared with the case of being separately formed.

According to aspect (4), since the direction changing portion is formed separately from the housing and is fixed to the housing, the degree of freedom of design can be increased and the shape, the material, and the like of the direction changing portion can be arbitrarily set.

According to aspect (5), since the liquid medium passage is disposed below the guiding portion, the liquid medium flowing along the guiding portion can be supplied to a desired position of the supply target portion through the liquid medium passage.

According to aspect (6), since the direction changing portion is provided on the region on the downstream side from the upper part of the rotating body in the rotation direction of the rotating body, on the inner surface of the housing, the liquid medium scattered by the rotating body can be collected while flowing along the inner surface of the housing.

According to aspect (7), since the rotation direction is a rotation direction of the rotating body when the vehicle moves forward, it is possible to perform appropriate lubricating at the time of the forward movement of the vehicle which is more frequent.

According to aspect (8), since the second gear mechanically connected to the differential gear casing of the differential gear system functions as a rotating body for scattering the liquid medium, the liquid medium can be scattered in conjunction with the traveling of the vehicle, and the supply target portion can also be lubricated and/or cooled without an oil pump.

DETAILED DESCRIPTION

A power system 1 according to an embodiment of the invention will be described with reference to FIGS. 1 to 9.

The power system 1 of the embodiment includes an electric motor 2 that is a drive source for driving axles, and is provided in an electric motor vehicle such as a hybrid vehicle or an electric vehicle as a front wheel drive system or a rear wheel drive system.

[Power System]

Figure 1:
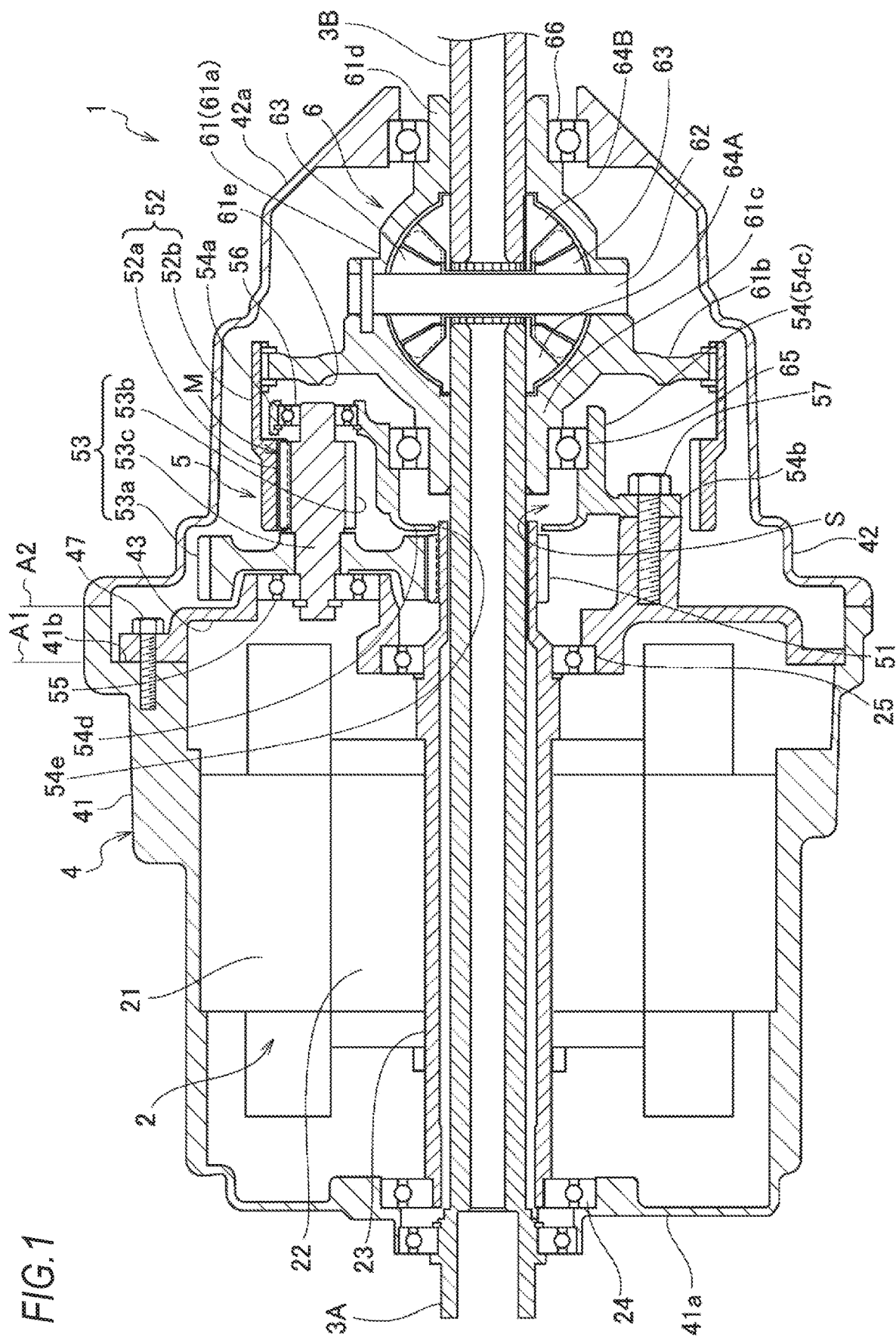
FIG. 1 is a sectional view of a power system according to an embodiment of the invention, and a sectional view taken along line A-A in FIG. 2.
Figure 2:
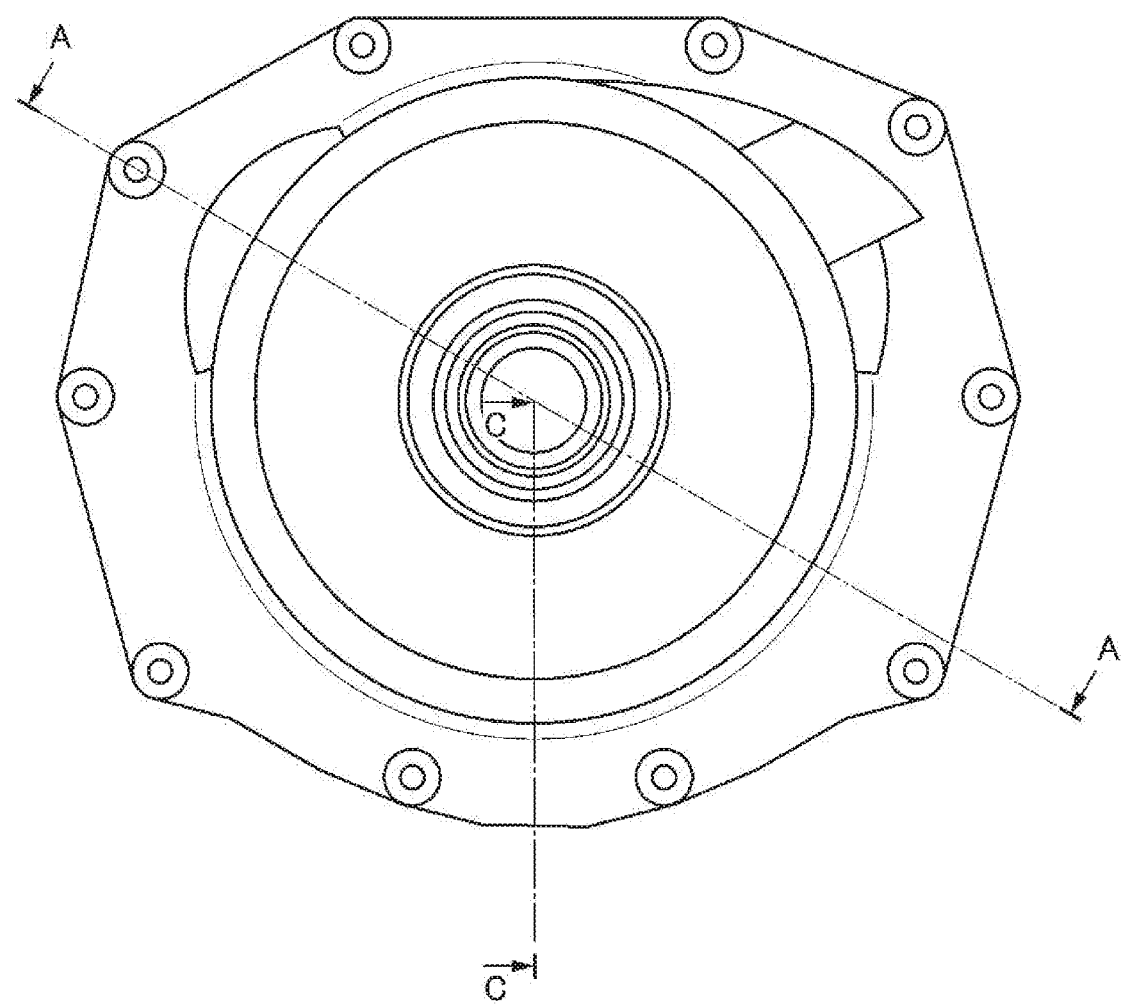
FIG. 2 is a side view of the power system according to the embodiment of the present invention.

In FIG. 1, reference numerals 3A and 3B indicate left and right axles, which are coaxially disposed in a vehicle width direction. In the power system 1, a housing 4 has the entire shape formed into a substantially cylindrical shape, and includes therein the electric motor 2 for driving the axles, a transmission 5 that decelerates driving rotation of the electric motor 2, and a differential gear system 6 that distributes the driving rotation decelerated by the transmission 5 to the axles 3A and 3B.

Figure 6:
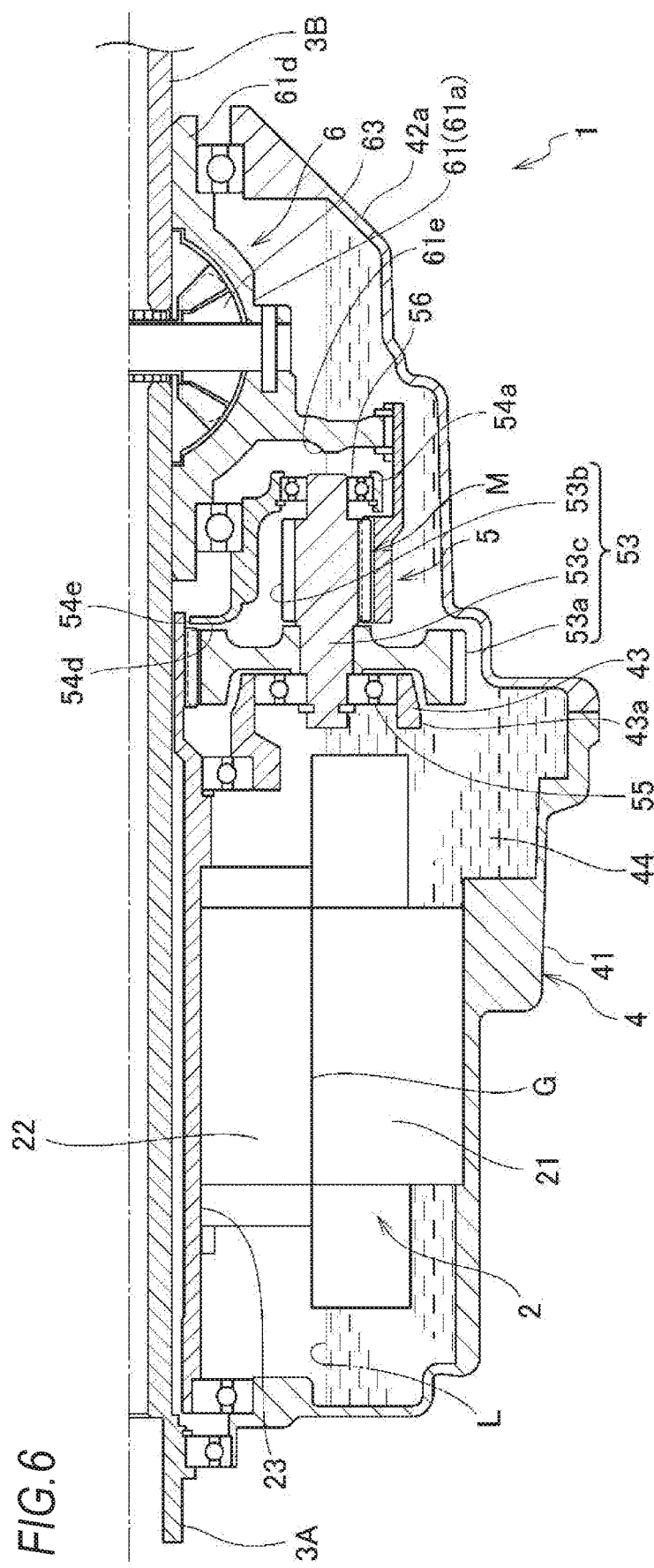
FIG. 6 is a sectional view taken along line C-C in FIG. 2.

The housing 4 includes a first casing 41 for accommodating the electric motor 2 and a second casing 42 for accommodating the transmission 5 and the differential gear system 6. A partition wall 43 is provided at a boundary between the first casing 41 and the second casing 42, and an internal space of the first casing 41 is partitioned from an internal space of the second casing 42 by the partition wall 43. The partition wall 43 is fastened to a step portion 41b provided on an outer peripheral part of the first casing 41 with a bolt 47. Therefore, a mating surface A1 of the first casing 41 and the partition wall 43 is located closer to the first casing 41 relative to a mating surface A2 of the first casing 41 and the second casing 42. A bottom of the housing 4 functions as a storage portion 44 for storing lubricating oil (liquid medium), and the lubricating oil is stored up to a stationary oil level L illustrated in FIG. 6. The stationary oil level L is set lower than an air gap G of the electric motor 2 (a clearance secured between an inner periphery of a stator 21 and an outer periphery of a rotor 22 to be described below) so as to reduce an agitation loss of the lubricating oil in the electric motor 2. As also illustrated in FIG. 6, a communication port 43a is formed in a lower part of the partition wall 43 to allow the lubricating oil to flow therethrough.

[Electric Motor]

The electric motor 2 includes the stator 21 fixed to an inner peripheral part of the first casing 41 and the rotor 22 disposed rotatably on the inner periphery of the stator 21. A rotor shaft 23 is coupled to an inner peripheral part of the rotor 22 so as to surround an outer periphery of one axle 3A, and the rotor shaft 23 is supported on an end wall 41a of the first casing 41 and the partition wall 43 through bearings 24 and 25 so as to be relatively rotatable coaxially with the axle 3A. In addition, one end of the axle 3A and the rotor shaft 23 penetrates the partition wall 43 and extends into the second casing 42, and the other end of the axle 3A penetrates the end wall 41a of the first casing 41 and extends to the outside of the housing 4.

[Transmission]

The transmission 5 includes a first gear 51 mechanically connected to the electric motor 2, a second gear 52 having the same rotation axis as that of the first gear 51 and mechanically connected to a differential gear casing 61 of the differential gear system 6, a plurality of counter gears 53 meshing with the first gear 51 and the second gear 52, and a counter holder 54 for supporting the plurality of counter gears 53 to be rotatable and not to revolve, and the decelerated driving rotation is output to the differential gear casing 61 of the differential gear system 6 through the counter gear 53 and the second gear 52 when the driving rotation of the electric motor 2 is input from the first gear 51.

The first gear 51 is an external gear, and is formed integrally with the rotor shaft 23. The counter gear 53 includes a large diameter gear 53a which is an external gear, a small diameter gear 53b which is an external gear, and a counter shaft 53c which supports the large diameter gear 53a and the small diameter gear 53b in an integrally rotatable manner. The large diameter gear 53a is coupled to the counter shaft 53c on a side of the electric motor 2, and meshes with the first gear 51. In addition, the small diameter gear 53b is formed integrally with the counter shaft 53c on a side of the differential gear system 6, and meshes with the second gear 52. An end of the counter shaft 53c on the side of the electric motor 2 is rotatably supported on the partition wall 43 through the bearing 55, and an end thereof on the side of the differential gear system 6 is rotatably supported on a counter gear supporting portion 54a of the counter holder 54 through the bearing 56.

Figure 3:
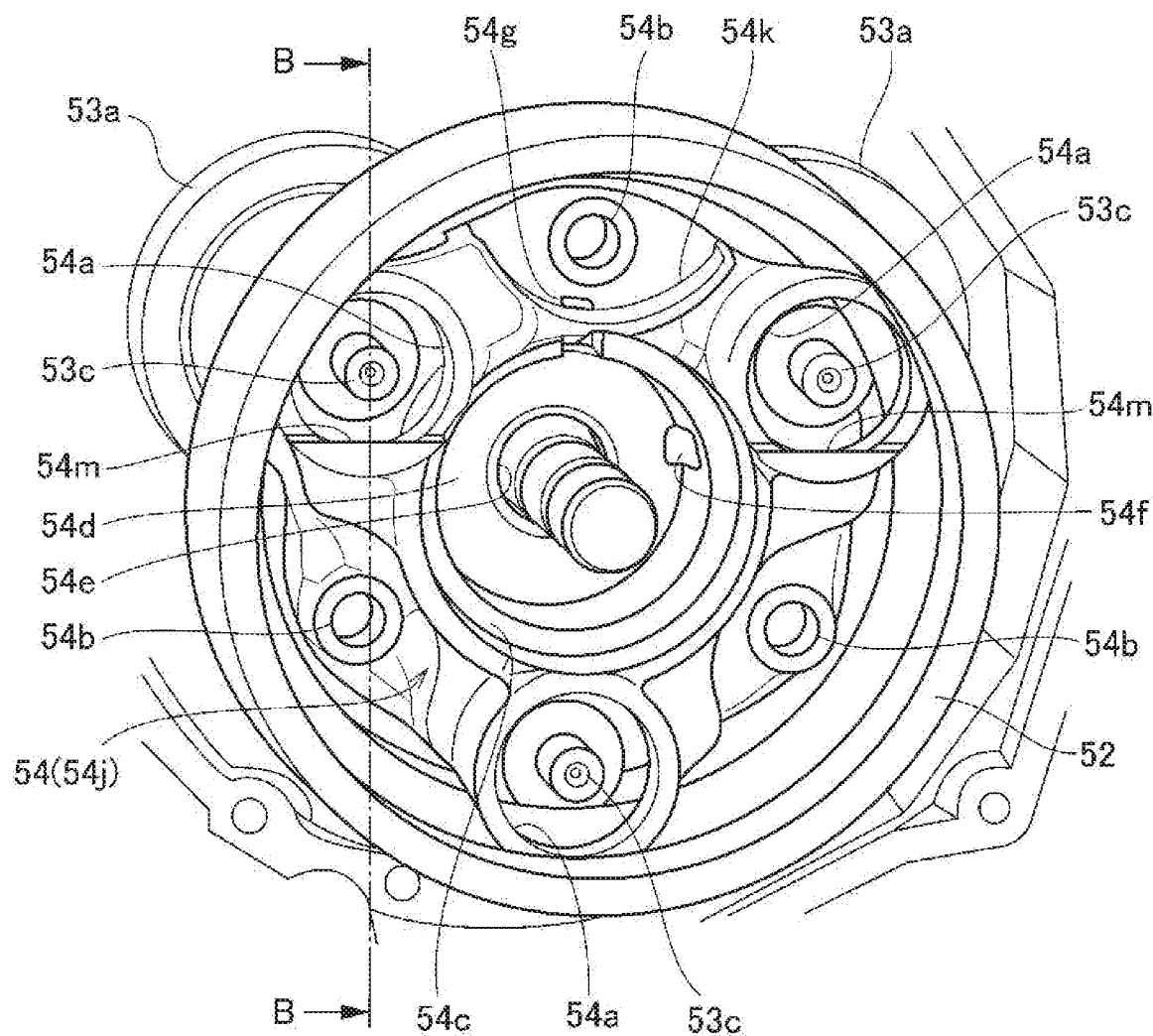
FIG. 3 is a perspective view of a counter gear, a second gear, and a counter holder (bearing is omitted) as viewed from a differential gear system.

As illustrated in FIG. 3, the transmission 5 of the embodiment includes three counter gears 53. The three counter gears 53 are disposed at equal intervals (intervals of 120°) in a circumferential direction around the first gear 51. At least one of the three counter gears 53 is partially or entirely located in the storage portion 44 described above, and functions as a rotating body that scatters the lubricating oil stored in the storage portion 44 with the rotation caused by the driving of the electric motor 2. In the example illustrated in FIG. 3, the lowermost counter gear 53 disposed immediately below the first gear 51 functions as a rotating body for scattering the lubricating oil, and thus the scattered lubricating oil is supplied to two upper counter gears 53. Here, assuming that the counter gear 53 rotates in the counterclockwise direction in FIG. 2, the lubricating oil scattered by the rotation of the lowermost counter gear 53 is mainly supplied to the counter gear located at an upper left, and then the lubricating oil scattered by the rotation of the counter gear located at the upper left is mainly further supplied to the counter gear located at an upper right.

In the second gear 52, a gear portion 52a is an internal gear and meshes with the small diameter gear 53b of the counter gear 53. The second gear 52 includes a connecting portion 52b extending from the gear portion 52a toward the differential gear system 6 across the outer peripheral side of the counter holder 54 (counter gear supporting portion 54a), and the connecting portion 52b is mechanically connected to the differential gear casing 61 of the differential gear system 6 through a connecting unit such as a spline. Further, the second gear 52 has a lower end located in the storage portion 44 described above, and also functions as a rotating body for scattering the lubricating oil stored in the storage portion 44 with the rotation caused by the driving of the electric motor 2.

Figure 4:
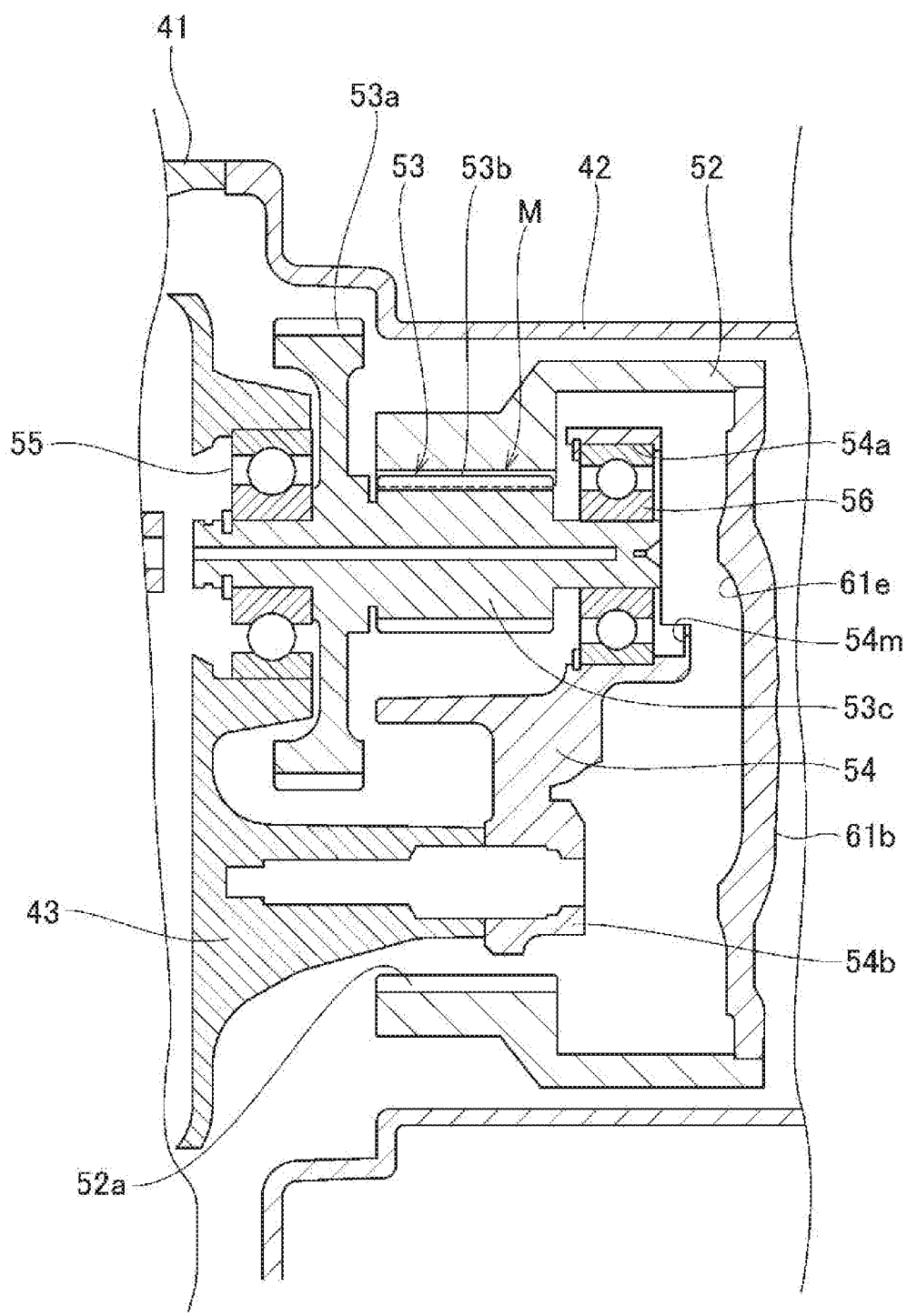
FIG. 4 is a sectional view taken along line B-B in FIG. 3.
Figure 5:
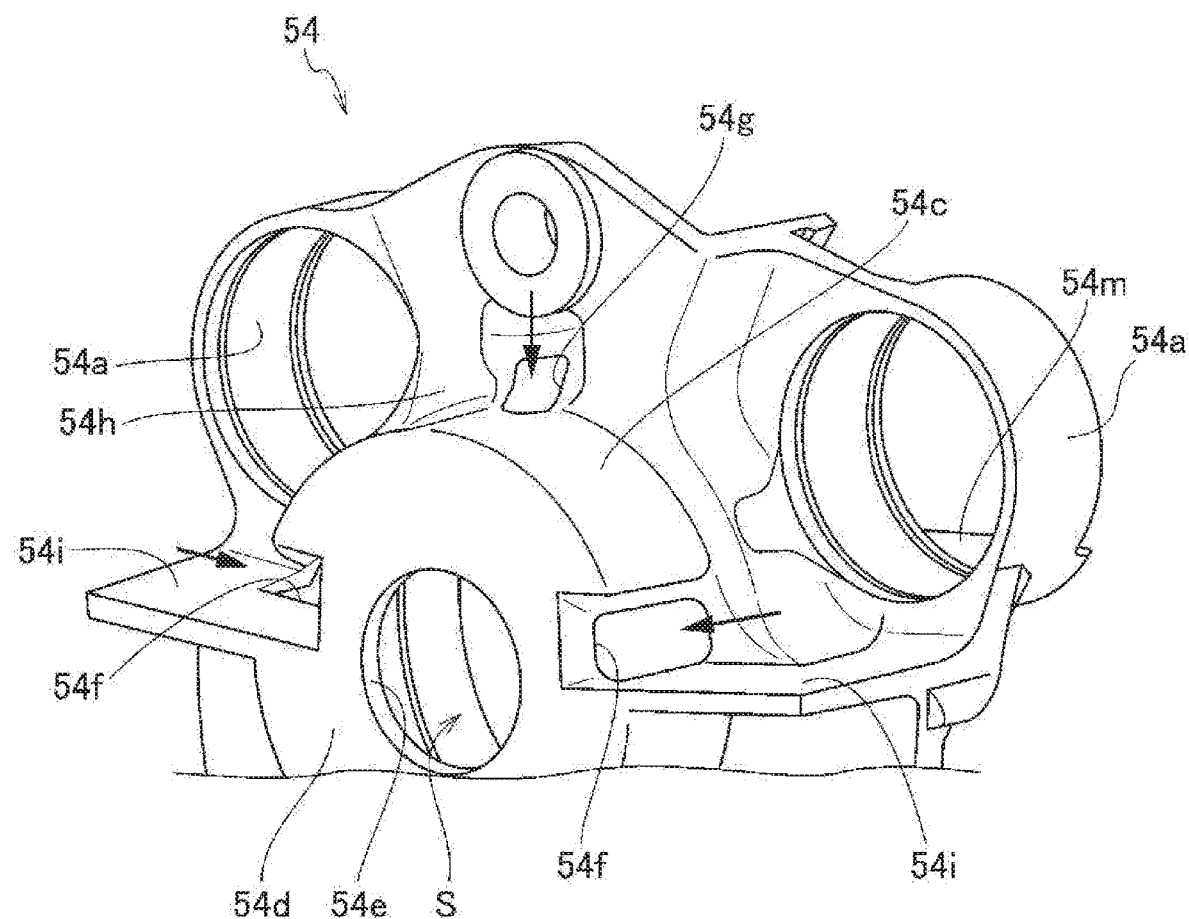
FIG. 5 is a perspective view of a main part of the counter holder when viewed from the counter gear side.

As illustrated in FIGS. 3 to 5, the counter holder 54 includes three counter gear supporting portions 54a, each of which rotatably supports the counter shaft 53c of the counter gear 53 through the bearing 56, three fixed portions 54b that are fixed to the partition wall 43, and a bottomed cylindrical cup portion 54c formed on a center (on an inner diameter side of the counter gear supporting portion 54a and the fixed portion 54b) of the counter holder 54.

The counter gear supporting portion 54a is disposed on the side of the differential gear casing 61 of the differential gear system 6 relative to a meshing portion M between the second gear 52 mechanically connected to the differential gear casing 61 of the differential gear system 6 and the small diameter gear 53b of the counter gear 53. Thus, the other end of the counter shaft 53c, in which one end thereof is supported by the partition wall 43 through the bearing 55, is supported by the counter gear supporting portion 54a through the bearing 56, and thus the counter gear 53 can be appropriately supported in a state of being held at both sides.

The three fixed portions 54b are located at intermediate portions between the counter gear supporting portions 54a adjacent to each other in the circumferential direction, and are fastened to the partition wall 43 with bolts 57, respectively. Thereby, the partition wall 43 serves as a support member of the counter holder 54 as well as a support member of the counter shaft 53c.

The cup portion 54c surrounds the outer periphery of one axle 3A through the space portion S from one end side to the other end side of the meshing portion M in the axial direction and on the inner peripheral side of the meshing portion M in the radial direction, and the bottom 54d on one end side is provided with a through-hole 54e through which the axle 3A penetrates. In addition, the inner peripheral part on the other end side of the cup portion 54c rotatably supports one end side of the differential gear casing 61 through the bearing 65. Thereby, the counter holder 54 serves as a support member of the differential gear casing 61 as well as a support member of the counter gear 53.

[Differential Gear System]

The differential gear system 6 includes the differential gear casing 61, a differential pinion shaft 62, a differential pinion gear 63, and left and right side gears 64A and 64B so as to allow difference in rotation of the left and right axles 3A and 3B while distributing the driving rotation, which is input to the differential gear casing 61 from the second gear 52, to the left and right axles 3A and 3B.

The differential gear casing 61 includes a spherical differential gear casing body 61a that accommodates the differential pinion shaft 62, the differential pinion gear 63, and the left and right side gears 64A and 64B, an input plate 61b that extends in the radial direction from the outer periphery of the differential gear casing body 61a and is mechanically connected to the second gear 52, and left and right extension portions 61c and 61d that extend in the axial direction from both sides of the differential gear casing body 61a. One extension portion 61c rotatably supports the one axle 3A at an inner peripheral part thereof, and an outer peripheral part thereof is rotatably supported by the counter holder 54 through the bearing 65. Further, the other extension portion 61d rotatably supports the other axle 3B at an inner peripheral part thereof, and an outer peripheral part thereof is rotatably supported by the end wall 42a of the second casing 42 through the bearing 66.

The differential pinion shaft 62 is supported by the differential gear casing body 61a so as to be directed in a direction orthogonal to the axles 3A and 3B, and rotatably supports two differential pinion gears 63, which are bevel gears, inside the differential gear casing body 61a. That is, the differential pinion shaft 62 allows the differential pinion gears 63 to rotate while revolving with the rotation of the differential gear casing 61.

The left and right side gears 64A and 64B are bevel gears, are rotatably supported inside the differential gear casing body 61a so as to mesh with the differential pinion gears 63 from both sides, and are mechanically connected to the left and right axels 3A and 3B through the connecting unit such as the spline. In a state where the differential pinion gears 63 revolve without rotating, for example, during straight running, the left and right side gears 64A and 64B rotate at a constant speed, and the driving rotation is transmitted to the left and right axles 3A and 3B. Furthermore, during curve running or left or right turning, the differential pinion gears 63 rotate, so that the left and right side gears 64A and 64B rotate relative to each other and the difference in rotation between the left and right axles 3A and 3B is allowed.

[Lubrication Function of Counter Holder]

Next, a lubrication function of the counter holder 54 will be described.

The counter holder 54 has a storage space to store lubricating oil scattered from the storage portion 44 of the housing 4 by the second gear 52 or the counter gear 53. The storage space is the above-described space portion S formed by the cup portion 54c and the one axle 3A, and the lubricating oil scattered by the second gear 52 or the counter gear 53 flows into the space portion S through communication holes 54f and 54g (which will be described below) communicating with the space portion S.

The lubricating oil flowing into the space portion S is supplied to the above-described bearing 65 which is disposed adjacent to the space portion S for rotatably supporting one end side of the differential gear casing 61, whereby the bearing 65 is properly lubricated. In addition, the lubricating oil is also distributed from the space portion S to the inside of the differential gear system 6 requiring lubrication and the electric motor 2 that needs to be cooled by the lubricating oil. More specifically, the lubricating oil is supplied from the space portion S through the clearance between the axle 3A and the extension portion 61c of the differential gear casing 61 to the inside of the differential gear system 6, and is supplied from the space portion S to the electric motor 2 through the clearance between the axle 3A and the rotor shaft 23.

As illustrated in FIG. 5, the counter holder 54 includes first guide portions 54i for receiving the lubricating oil, which is scattered by the second gear 52 or the counter gear 53, on a first face 54h opposed to the counter gear 53. The first guide portions 54i are protrusions that are formed on both sides of the cup portion 54c and extend linearly toward the cup portion 54c, and guide the received lubricating oil to the cup portion 54c. The communication hole 54f is formed in a connecting portion between the first guide portion 54i and the cup portion 54c, so that the lubricating oil received by the first guide portion 54i is stored in the space portion S through the communication hole 54f.

As illustrated in FIG. 3, the counter holder 54 includes a second guide portion 54k for receiving the lubricating oil, which is scattered by the second gear 52 or the counter gear 53, on a second face 54j opposed to the differential gear casing 61 of the differential gear system 6. The second guide portion 54k is a protrusion that is formed above the cup portion 54c and extends in an arc shape below the uppermost fixed portion 54b, and guides the received lubricating oil to the cup portion 54c. The communication hole 54g is formed in a connecting portion between the second guide portion 54k and the cup portion 54c, so that the lubricating oil received by the second guide portion 54k is stored in the space portion S through the communication hole 54g. The communication hole 54g also communicates with the first face 54h of the counter holder 54.

As illustrated in FIGS. 3 and 4, among the counter gear supporting portions 54a of the counter holder 54, the counter gear supporting portions 54a supporting the two upper counter gears 53 respectively include pockets 54m that store the lubricating oil at an opening end on the side of the second face 54j opposed to the differential gear casing 61 of the differential gear system 6. The pocket 54m temporality holds the lubricating oil supplied to the counter gear supporting portion 54a, thereby enabling proper lubrication of the bearing 56.

By the way, some of the lubricating oil supplied from the space portion S to the bearing 65 flows to the outer periphery of the differential gear casing 61 by passing through the bearing 65, and receives a centrifugal force caused by the rotation of the differential gear casing 61 and moves radially outward along the input plate 61b. The input plate 61b of the embodiment includes a third guide portion 61e that guides the lubricating oil moving radially outward along the input plate 61b to the two upper counter gear supporting portions 54a. The third guide portion 61e is an edge of an annular recess formed on a surface of the input plate 61b opposed to the counter gear 53, and the lubricating oil moving radially outward along the input plate 61b is guided to the counter gear supporting portion 54a by the edge formed in a position opposed to the counter gear supporting portion 54a in the radial direction. Some of the lubricating oil scattered by the second gear 52 also flows in the same manner.

[Direction Changing Portion]

Figure 7:
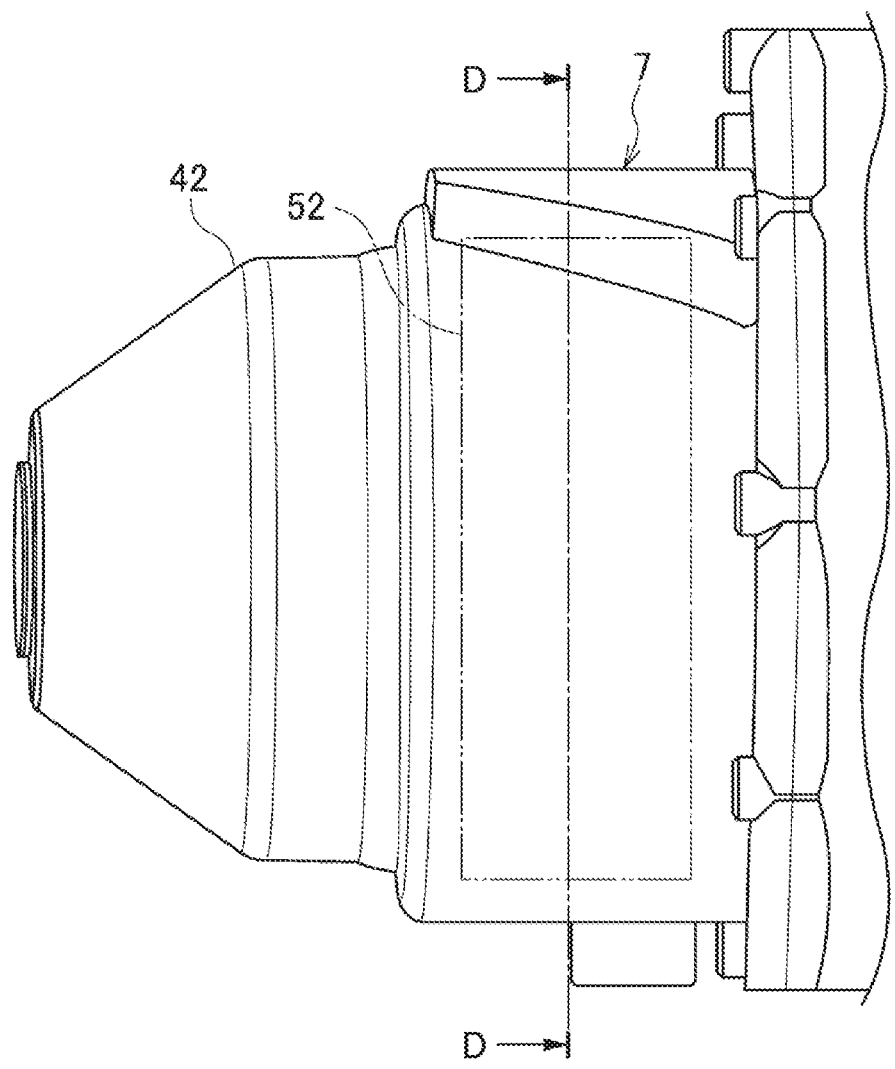
FIG. 7 is a rear view of a second casing.
Figure 8:
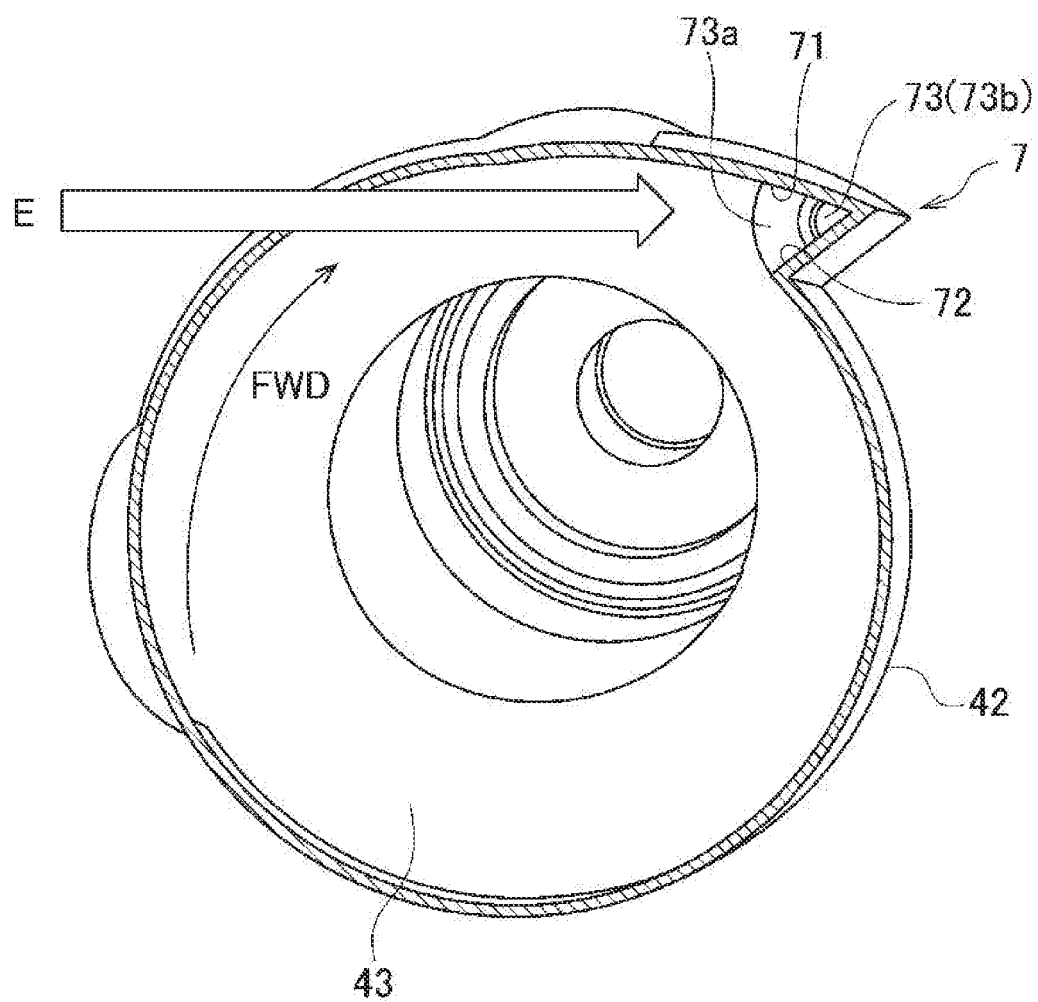
FIG. 8 is a sectional perspective view taken along line D-D in FIG. 7.
Figure 9:
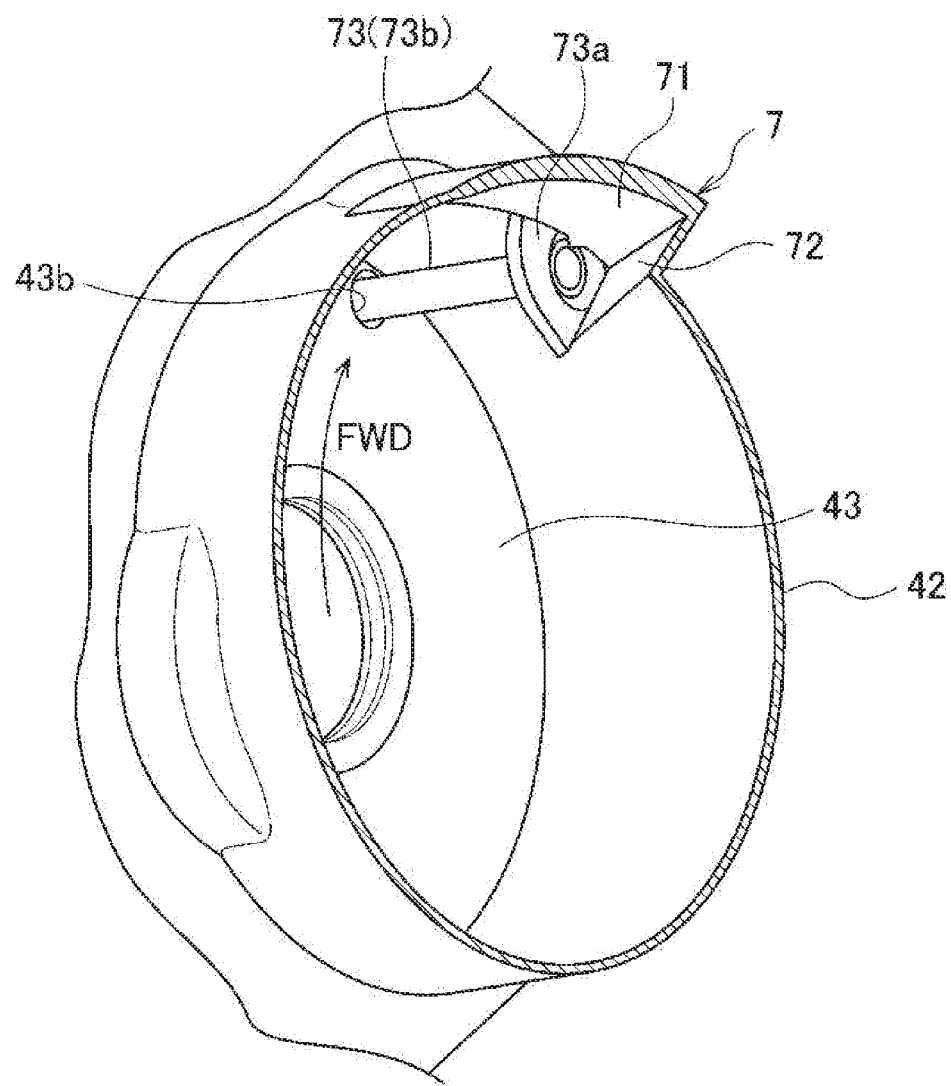
FIG. 9 is a sectional perspective view taken along line D-D in FIG. 7 as viewed in a direction of arrow E in FIG. 8.

A direction changing portion 7, which is a main portion of the present invention, will be described mainly with reference to FIGS. 7 to 9. A rotation direction indicated by an arrow (FWD) in FIGS. 8 and 9 is a rotation direction of the second gear 52 at the time of forward movement of the vehicle.

On the inner surface of the second casing 42, the direction changing portion 7 is provided for changing the flow direction of the lubricating oil scattered by the second gear 52 toward the electric motor 2 disposed on one side in the axial direction of the second gear 52. The direction changing portion 7 is recessed in the inner surface of the second casing 42, stores the lubricating oil scattered by the second gear 52 in the recessed space, and supplies the lubricating oil stored therein to the electric motor 2 that needs to be lubricated and cooled.

More specifically, the direction changing portion 7 includes a collecting portion 71 that collects the lubricating oil scattered by the second gear 52 and a guiding portion 72 that guides the lubricating oil collected by the collecting portion 71 to the electric motor 2, and supplies the lubricating oil guided by the guiding portion 72 to the electric motor 2 through a pipe body 73.

The collecting portion 71 is gradually inclined toward the downstream side in the rotation direction of the second gear 52 so as to be separated from the outer periphery of the second gear 52, whereby the recessed space for storing the lubricating oil scattered by the second gear 52 is formed in the inner surface of the second casing 42. In addition, the collecting portion 71 is provided at a region on a downstream side from the uppermost part of the second gear 52 in the rotation direction of the second gear 52, on the inner surface of the second casing 42. Thus, the lubricating oil scattered beyond the uppermost part of the second gear 52 can be collected while flowing along the inner surface of the second casing 42. The collecting portion 71 is provided at the region on the downstream side from the uppermost part of the second gear 52 in the rotation direction of the second gear 52 and is gradually inclined toward the downstream side in the rotation direction of the second gear 52 so as to be separated from the outer periphery of the second gear 52, whereby kinetic energy of the lubricating oil flowing along the collecting portion 71 gradually increases.

The guiding portion 72 rises from a downstream-side end of the collecting portion 71 in the rotation direction of the second gear 52 toward the inside of the second casing 42, and is inclined downward toward the electric motor 2. Thus, the lubricating oil flowing along the collecting portion 71 with kinetic energy collides with the guiding portion 72, and thus the flow direction of the lubricating oil is changed. As a result, the lubricating oil is guided to the electric motor 2 along the inclination of the guiding portion 72. Further, the guiding portion 72 of the present embodiment is provided so as to cross a lower end of the collecting portion 71 in a vertical direction and is inclined downward toward the electric motor 2, and thus the lubricating oil collected by the collecting portion 71 can be guided to the electric motor 2 using gravity.

The pipe body 73 is provided at a lower end of the guiding portion 72 on the side of the electric motor 2, and includes a flange 73a that receives the lubricating oil guided by the guiding portion 72 and a hollow pipe 73b that supplies the lubricating oil received by the flange 73a to a desired position of the electric motor 2. The pipe 73b penetrates into a through-hole 43b of the partition wall 43, thereby supplying the lubricating oil guided by the guiding portion 72 to the electric motor 2 in the first casing 41.

As described above, according to the power system 1 of the present embodiment, since the inner surface of the housing 4 is provided with the direction changing portion 7 that changes the flow direction of the lubricating oil scattered by the second gear 52 toward the electric motor 2, it is possible to supply appropriately the lubricating oil scattered by the second gear 52 to the electric motor 2 disposed on one side in the axial direction of the second gear 2 while preventing the housing 4 from being increased in size, whereby the supply target portion can also be lubricated and/or cooled without an electric oil pump.

In addition, the direction changing portion 7 is gradually inclined toward the downstream side in the rotation direction of the second gear 52 so as to be separated from the outer periphery of the second gear 52 and includes the collecting portion 71 receiving the lubricating oil scattered by the second gear 52 and the guiding portion 72 provided so as to cross the lower end of the collecting portion 71 and inclined downward toward the electric motor 2, and thus it is possible to guide the lubricating oil collected by the collecting portion 71 to the electric motor 2, using gravity, through the guiding portion 72.

Further, since the direction changing portion 7 is recessed in the inner surface of the housing 4, it is possible to supply the lubricating oil stored in the recessed space to the electric motor 2.

Further, since the direction changing portion 7 is integrally formed on the inner surface of the housing 4, the number of parts can be reduced as compared with the case of being separately formed.

In addition, since the pipe body 73 is disposed below the guiding portion 72, the lubricating oil flowing along the guiding portion 72 can be supplied to a desired position of the electric motor 2 through the pipe body 73. Instead of the pipe body 73, a lubricating oil passage such as a gutter or an oil guide may be disposed below the guiding portion 72.

Further, since the direction changing portion 7 is provided on the region on the downstream side from the upper part of the second gear 52 in the rotation direction of the second gear 52, on the inner surface of the housing 4, the lubricating oil scattered by the second gear 52 can be collected while flowing along the inner surface of the housing 4.

In addition, since the rotation direction is a rotation direction of the second gear 52 when the vehicle moves forward, it is possible to perform appropriate lubricating at the time of the forward movement of the vehicle which is more frequent.

Further, since the second gear mechanically connected to the differential gear casing 61 of the differential gear system 6 functions as a rotating body for scattering the lubricating oil, the lubricating oil can be scattered in conjunction with the traveling of the vehicle, and the supply target portion can also be lubricated and/or cooled without an oil pump.

It is noted that the invention is not limited to the above-described embodiment, but can be appropriately modified and improved, for example.

For example, the power system 1 may adopt a forced lubrication system using an oil pump together with the splashing type lubrication system.

Further, although the direction changing portion 7 of the present embodiment is formed integrally with the second casing 42, the direction changing portion may be formed on the inner surface of the second casing 42 in such a manner that the direction changing portion is formed separately from the second casing 42 and is fixed to the second casing 42.

The direction changing portion 7 of the present embodiment changes the flow direction of the lubricating oil scattered by the second gear 52 toward the electric motor 2 disposed on one side in the axial direction of the second gear 52, but may change the lubricating oil toward the supply target portion, which is disposed on the other side in the axial direction of the second gear 52, for example, the bearing 66.

The invention claimed is:

1. A power system comprising:
    a rotating body;
    a housing that accommodates the rotating body; and
    a storage portion that is provided at a bottom of the housing to store a liquid medium, wherein
    a part of the rotating body is located in the storage portion, the housing comprises:
        a supply target portion that needs to be lubricated or cooled and that is provided on one side in an axial direction of the rotating body; and
        a direction changing portion that is provided on an inner surface of the housing and that changes a flow direction of the liquid medium scattered by the rotating body toward the supply target portion, and
    the direction changing portion includes:
        a collecting portion that is gradually inclined toward a downstream side in a rotation direction of the rotating body so as to be separated from an outer periphery of the rotating body and that receives the liquid medium scattered by the rotating body; and
        a guiding portion that is provided so as to cross a lower end of the collecting portion and that is gradually inclined downward toward the supply target portion.

2. The power system according to claim 1, wherein the direction changing portion is recessed in the inner surface of the housing.

3. The power system according to claim 2, wherein the direction changing portion is formed integrally with the housing.

4. The power system according to claim 2, wherein the direction changing portion is formed separately from the housing and is fixed to the housing.

5. The power system according to claim 4, wherein
a liquid medium passage is disposed below the guiding portion to supply the liquid medium to the supply target portion.

6. The power system according to claim 1, wherein
the direction changing portion is provided at a region on a downstream side from an uppermost part of the rotating body in the rotation direction, on the inner surface of the housing.

7. The power system according to claim 6, wherein
the power system is a power system for a vehicle, and
the rotation direction is a rotation direction of the rotating body when the vehicle moves forward.

8. The power system according to claim 1, wherein
the power system includes:
an electric motor that drives a left wheel and a right wheel of the vehicle;
a transmission that is disposed on power transmission paths between the electric motor and the left wheel and between the electric motor and the right wheel; and
a differential gear system that distributes output power shifted by the transmission to the left wheel and the right wheel, the housing accommodates the electric motor, the transmission, and the differential gear system, the transmission includes:
- a first gear that is mechanically connected to the electric motor;
- a second gear that has a rotation axis in common with the first gear and is mechanically connected to a differential gear casing of the differential gear system; and
- a counter gear that meshes with the first gear and the second gear, the supply target portion is the electric motor, and
the rotating body is the second gear.

* * * * *